July 23, 1935.  F. H. SCANTLEBURY  2,009,210
ILLUMINATED MEASURING DEVICE
Filed March 10, 1932   3 Sheets-Sheet 1
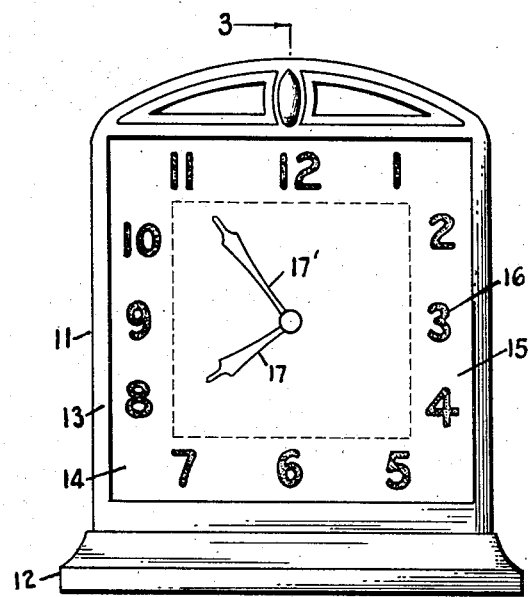
INVENTOR
Francis H. Scantlebury
BY
ATTORNEY July 23, 1935.   F. H. SCANTLEBURY   2,009,210
ILLUMINATED MEASURING DEVICE
Filed March 10, 1932   3 Sheets-Sheet 2

INVENTOR
Francis H. Scantlebury
BY
ATTORNEY

July 23, 1935.   F. H. SCANTLEBURY   2,009,210
ILLUMINATED MEASURING DEVICE
Filed March 10, 1932   3 Sheets-Sheet 3

INVENTOR
Francis H. Scantlebury
BY
ATTORNEY

Patented July 23, 1935

2,009,210

UNITED STATES PATENT OFFICE 2,009,210

ILLUMINATED MEASURING DEVICE

Francis H. Scantlebury, Brooklyn, N. Y.

Application March 10, 1932, Serial No. 598,004

11 Claims. (Cl. 240—2.1)

The invention relates to illuminated devices, as of the edge-lighted or back-lighted type and embodying one or more sheets of transparent glass or other transparent or translucent or perforated opaque material bearing suitable designs or configurations a part of which, at least, is constituted by subdivisions for association with an element caused to move relatively thereto.

The said configurations may be etched or sandblasted into the surface of a glass plate when utilized and in which case they are illuminated by refracted light entering one or more edges of the glass, or, the configurations may be otherwise provided on a plate with the light directed therethrough from the rear of said plate.

The invention, for example, may embody illuminated time pieces, measuring apparatus, etc., and is especially adaptable to synchronous electric motor operated time pieces wherein the power for effecting the operation of the time piece may also serve to provide the desired illumination.

The invention has for an object to effectively associate illuminated configurations of a dial or like plate with a movable member or members and in a manner such that these will also be clearly visible when the dial member is illuminated, making the device particularly suitable for use is darkened surroundings, as well as in daylight when the device is not illuminated.

A further object of the invention resides in a simple and inexpensive construction which may readily be adapted, for example, to time pieces of standard construction, and particularly to electrically operated time pieces.

The nature of the invention, however, will best be understood when described in connection with the accompanying drawings, in which:

Fig. 1 is a front elevation of the novel illuminated device as embodied in a clock.

Fig. 2 is a plan thereof with portion of the cover broken away to disclose the interior, a portion of which is shown in horizontal section.

Fig. 3 is a vertical section through the device and taken on the line 3—3, of Fig. 1.

Fig. 4 is a perspective view of a frame member utilized for mounting various elements comprising the illuminated portion of the device.

Figure 5:
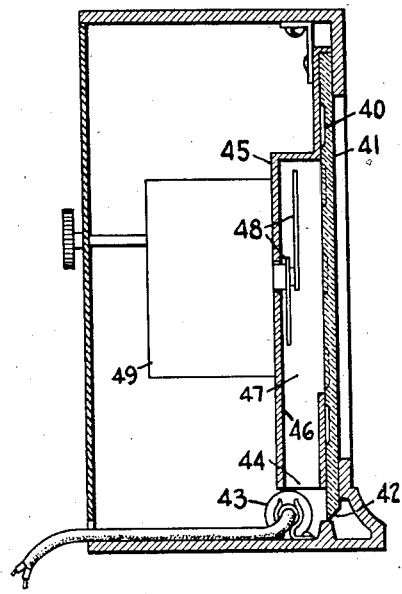
Fig. 5 is a vertical section through the device and illustrates a modification.

Referring to the drawings, the invention is illustrated as embodied in a time piece, more particularly of the synchronous electric motor operated type, although the invention is not to be understood as being restricted to clocks of this type, as the ordinary spring-operated clock may also be employed, particularly where alternating current is not available. Also, the invention is applicable to other measuring apparatus embodying a scale or the like and a member movable in relation thereto.

In carrying out the invention, one or more transparent plates of glass or other transparent or translucent or perforated opaque material serves to close in whole or in part the front of a suitable case or cabinet for housing the driving mechanism of the movable member or members to be associated with suitable configurations or divisions provided upon said plate or plates constituting the dial. These configurations may be provided for and illuminated in the case of glass, for example, substantially in the manner more particularly set forth in a prior U. S. Letters Patent #1,707,965, granted to me the 2nd day of April, 1929; or they may be outlined on a plate or provided by stencil cuttings or perforations therein.

Back of this plate or plates and offset therefrom is located a background member which is to be sufficiently displaced in any suitable manner from the inner face of the glass plate or plates to afford a compartment for accommodating the movable element or elements; and a shaft or arbor for moving the same is then arranged to project through the background member into the compartment thus provided and within which said movable element or elements then moves in juxtaposition to the divisions and/or configurations upon the dial plate and are visible therethrough.

Provision is also made, as through a lamp or lamps located in the casing, whereby to illuminate simultaneously the plate or plates and the compartment. The moving element and background, moreover, are provided in contrasting colors so that when the compartment is thus illuminated the said element or elements will be prominently displayed against the illuminated background and will always be clearly visible.

Furthermore, the background member may be so constructed as to retain also the plate elements and lamp if desired and will afford thus a compact unit for association with the driving mechanism, both unit and mechanism being located within the case or cabinet housing the driving means for the movable member or members.

The entire mechanism, including the motor 10, is shown as housed within a suitable cabinet or the like 11 mounted upon a base 12. The front wall 13 of the cabinet is provided with an aperture 14 to expose the face or dial of the clock, said opening in the present instance being square, but, of course, the particular design of the opening may be varied as desired.

Through this aperture 14 is visible a dial plate 15 carrying the desired design or configurations such as the time subdivisions or numerals 16 and any other ornamentation or the like as may be desired. Through the central portion of this dial and the aperture 14 are also visible the hands 17 and 17' of the clock, the same being mounted upon arbors 18 and 19 driven from the clock 10 in the usual manner.

Figure 6:
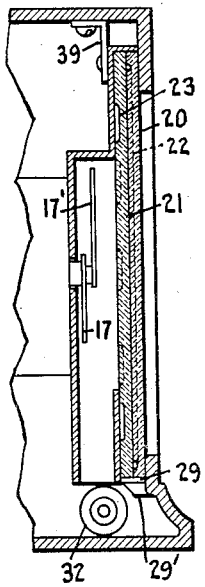
Fig. 6 is a fragmentary vertical section illustrating a further modification.
Figure 10:
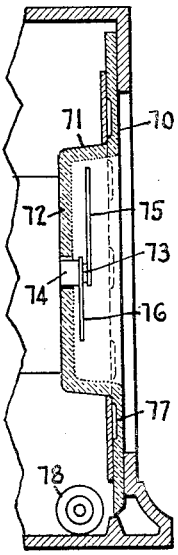
Fig. 10 is fragmentary vertical section of a still further modification.

The dial 15 is in the nature of a plate closing the front portion of the housing and in the present embodiment is a transparent plate of glass in which the configurations 16 are etched as by sand-blasting or the like, and as is more particularly set forth in my aforesaid prior U. S. Letters Patent, to provide the desired design.

Where a multi-color design is desired, a plurality of transparent plates 20 and 21, Fig. 6, are provided, each plate carrying the particular configuration for making up the composite design and being colored along their respective edges with the desired color with which the particular configurations making up the composite design are to be illuminated, all of which is fully set forth in my said prior patent. The central portion of plate 15 in either case is free of configurations and remains clear to render visible therethrough the hands 17 and 17' which are arranged in juxtaposed relationship, in the present embodiment, with the time subdivisions 16 shown as the hour divisions of the clock, no minute divisions being indicated.

These, however, may be provided intermediate the hour configurations but would be of the same color as such subdivisions. The minute subdivisions may, if desired, be provided in a different color from the hour subdivisions, reference being had to Fig. 6 of the drawings, by providing such subdivisions 22 in the plate 20 and the hour subdivisions 23 in the plate 21.

In order that the hands of the clock may be clearly visible at all times, particularly in darkened surroundings, a background member is to be associated therewith, the same being provided, for example, by a frame member embodying the forward wall 25 of opaque material and serving as a backing for the outer portion of the plate 15 and its configurations, which plate may also be retained by the frame as through the provision of flanges 26—27 and 28 directed outwardly from its corresponding side edges and top edge, while lips 29 directed outwardly from the bottom edge afford a vertical support for the said plate.

Furthermore, a clamp 30 may extend backwardly from the lower edge to afford a support for the lamp socket 31 carrying the illuminating element or electric lamp 32. This lamp, of course, must be located in proximity to one of the edges of the plate 15 in order that light may be directed therethrough to illuminate the configurations thereon, and in the present embodiment is shown as located beneath the lower edge of the plate.

The frame member is also extended backwardly from an aperture 35 therein which is coaxial with the aperture 14 of the housing and registers with the central clear portion of plate 15. A box-like extension is thereby afforded of which the background wall 36 is displaced from the forward border portion 25 of the frame member as well as from the plate 15 carried thereby, said plate and background wall thus forming therebetween a light chamber 37 within which the hands 17 and 17' may operate. An opening 38 is provided also in this background wall portion to pass the arbors 18 and 19 of the clock mechanism for moving the said hands.

This frame member thus affords a very convenient one-piece support for the said plate 15 as well as the lamp 32 and may be held to the housing, for example, the top thereof, as by means of an attaching lug 39 which may be screwed to said housing top, the lips 29 resting upon supports 29' extending backwardly from the lower portion of the cabinet 11.

The lower wall of the box-like extension is cut away or preferably left entirely open, as indicated in Fig. 3 of the drawings, so that rays of light from the lamp 32 will also be directed upwardly into the chamber 37 simultaneously with the illumination of the configurations of plate 15. By directing light into the chamber 37, the forward face of the background member 36 will be illuminated; and if this face be provided in a color contrasting with the color of the hands 17 and 17' of the clock, the latter will stand out distinctly with reference to the field provided by the background member and thus will be visible at all times. For example, the face of the background member may be white or of a light color while the hands are black or of a dark color.

A very effective type of clock device results from this combination of the time subdivisions 16 in any desired color, each subdivision being individually illuminated, and juxtaposed with respect to the hands 17 and 17' which stand out prominently against the background 36.

In Fig. 5 a modification is illustrated in connection with the illumination of the configurations 40 on the transparent plate 41, the said plate at its lower edge being bevelled as at 42 and said portion being either polished or provided with a mirrored surface in order to reflect upwardly light from the lamp 43. In this embodiment, the lamp is located entirely below the opening 44 of the box-like structure 45 affording a background member 46 and light chamber 47 in which operate the hands 48 of the clock device 49.

Various other modifications in the design and arrangement in the mounting of the plate, the light chamber and background member will suggest themselves.

Figure 7:
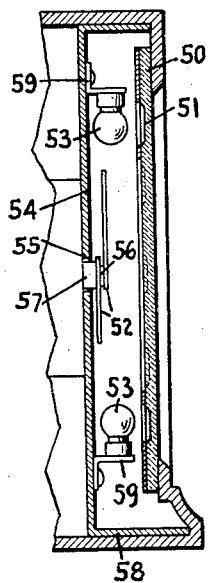
Fig. 7 is a fragmentary vertical section through the device and illustrates a different way of providing the configurations as well as a different manner of effecting the illumination thereof.

For example, instead of edge-lighting the configuration-bearing plate, the configurations thereof may be back-lighted. Thus, reference being had to Fig. 7 of the drawings, a plate 50 may have the configurations 51 etched therein but the surrounding portions painted over with an opaque paint; or they may be provided through the use of a decalcomania applied to the back of the plate, the configurations being transparent and the field opaque. The movable element or hands 52 are located similarly to the arrangement of the previously described embodiments behind the plate 50 and are visible through its central portion, while above and below the said hands are located illuminating means such as the lamps 53 located behind the configuration-bearing portion of plate 50. The configurations will thus be illuminated simultaneously with the compartment in which the hands move, said hands being located in front of the background member 54 illuminated also by said lamps and being of a color contrasting with that of the hands. The background member in this instance is of a dished form with opening 55 provided centrally in its bottom for admitting the arbors 56 and 57 of the hands, the sides of the dished member fitting between the top and bottom of the housing member 58. The lamps 53 may also be supported by the bottom of the dished member, as shown, as upon suitable brackets 59 attached thereto.

Figure 8:
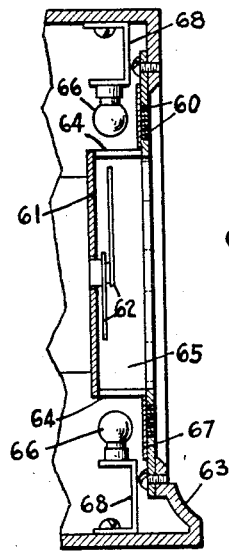
Fig. 8 is a similar view illustrating a further modification therein.
Figure 9:
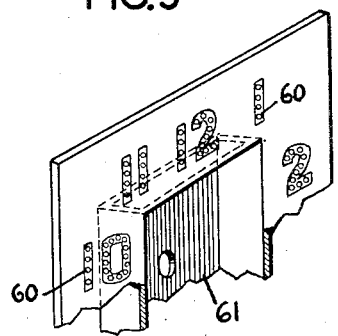
Fig. 9 is a fragmentary perspective view of the face of the device.

A simplified form of the novel device is indicated in Figs. 8 and 9 of the drawings wherein the plate and background member are constituted as a unit and are preferably of opaque material such as metal. The configurations are then provided by stencilling or perforating the metal, for example, in the provision of the perforations 60. As the central portion of the configuration-bearing plate is displaced rearwardly to afford the background 61, the hands 62 will be visible from the front of the cabinet 63. Slots 64 are provided in the top and bottom respectively of the displaced portion to admit light into the light chamber 65 for illumination of the background plate 61 from lamps 66.

These lamps are located also immediately behind the perforations 60 to direct light therethrough, it being preferable to utilize perforations rather than stencils as the latter would generally transmit an undesirable amount of light. If it be desired to have these configurations in color, an annular color screen member 67 may be located between lamps 66 and the perforations 60. The said lamps are attached, for example, to the top and bottom of the cabinet by brackets 68, and the entire structure may be inexpensively provided and is conveniently installed in a cabinet or the like.

If it be desired to provide the configurations in a transparent or translucent plate rather than as stencilled or perforated elements, the plate and background unit may be provided of transparent material such as a dished glass member having the flange 70 about the central portion constituted by the side wall 71 and bottom 72, the latter being perforated centrally to pass the driving arbors 73 and 74 for the hands 75 and 76, respectively. These hands then rotate within the bowl portion, and the background or bottom 72 may be illuminated by light directed through the sides, while the configurations may be similarly illuminated by light placed behind the same in case they are of the nature of the configurations set forth in Fig. 7. It is preferred, however, to edge-illuminate these configurations 77 as well as the bottom 72 and to this end a lamp 78 may be provided in proximity to the flanged portion for directing light therethrough to the configurations 77 which are then to be etched therein similarly to the arrangement set forth in Figs. 1–6.

The lamp, at the same time, will transmit light through the side wall and bottom edge so that the bottom itself, especially if etched, will be illuminated and provide a satisfactory and illuminated background contrasting with the hands 75 and 76.

Moreover, the sides may also be etched or they may be entirely covered by an opaque paint or other material so that only the bottom and the configurations will be illuminated. This presents a very effective arrangement and may be also inexpensively constructed.

Figure 11:
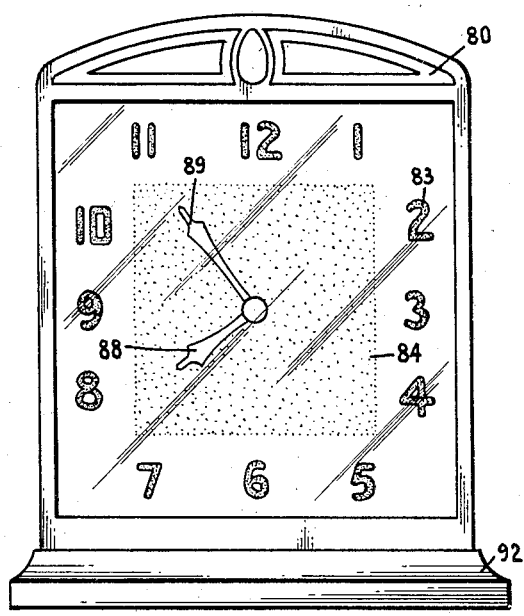
Figs. 11-13 illustrate the configurations and background provided substantially in the same plane.
Figure 12:
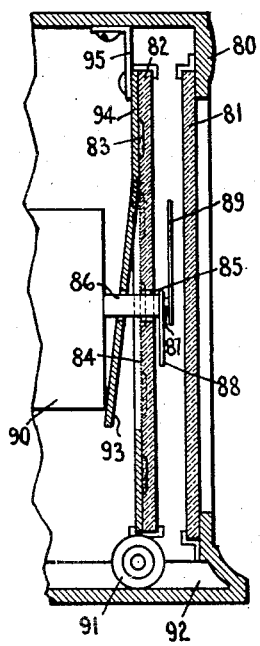
Figure 13:
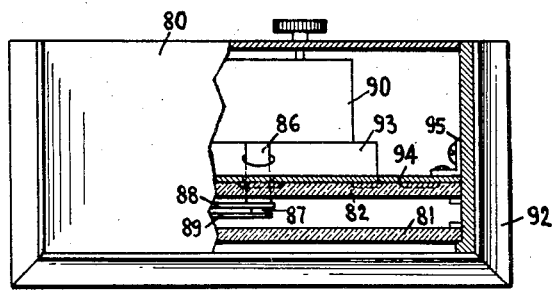

A further means for constituting the configuration-bearing element and the background member as a unit is illustrated in Figs. 11–13, inclusive. These figures further disclose the background and configuration-bearing portion as lying in one and the same plane. For example, the front aperture of a case 80 may be closed by a plate 81 of transparent glass behind which is located the combined configuration-bearing element and background member. As indicated, this unit comprises a plate 82 of transparent material such as glass and in which the time subdivisions 83 have been etched in the usual manner. In addition, the central portion of this plate 82 is etched or frosted as at 84 and the said frosted portion is centrally perforated as at 85 to pass therethrough the driving arbors 86 and 87 for the respective hour and minute hands 88 and 89, said arbors being driven from suitable clock mechanism contained within the casing 90. The etching or frosting of the central field portion 84 is preferably to a depth less than that of the configurations 83 surrounding the same and the configurations, particularly over the upper portion of the plate, will therefore receive ample illumination from a suitable lamp or the like 91 located in the base 92 of the case 80 and beneath the lower edge of the plate 82.

This edge-illumination of the plate will serve to a more or less degree to illuminate the central or field portion which in the present instance is shown as a centrally disposed square surrounded by a clear portion of the glass and in which are disposed the configurations or time subdivisions 83. It is desirable, however, to increase the illumination of this central or field portion and in front of which the hands 88 and 89 are adapted to move.

To this end, provision is made for backlighting this central portion as in the provision of a reflector element which may be constituted by a cut-out flap or the like 93 from a strip of sheet metal or like opaque material 94 backing the glass plate 82 and secured thereto, for example, by means of a suitable adhesive or the like. This plate affords also a means for securing the plate to the case 80 as by means of the bracket 95; and the flap 93 is also perforated to pass the arbors 86 and 87 of the clock mechanism. By bending back this flap at an angle, substantially as shown, a space will be provided between the bottom edge of the flap and the strip of metal to admit light from the lamp 91. Furthermore, the surface of the flap may be polished so that the same will serve to reflect this light to the frosted or etched portion 84 and effect the desired illumination thereof.

Thus, not only will the numerals or time subdivisions 83 on the plate 82 be illuminated, but an illuminated background or field 84 for the hands 88 and 89 is provided, both, however, lying substantially in the same plane rather than being displaced from each other as in the previously described embodiments.

I claim:

1. An illuminated device comprising a housing, a measuring member mounted therein and embodying a movable element, a transparent glass plate closing the forward portion of the housing, having etched configurations located in juxtaposition to the movable element and having an edge beveled and provided with a reflecting surface to direct light through said plate, a background member located behind said plate and displaced therefrom to afford a light chamber therebetween for accommodating the movement of the movable element, and an electric lamp located in proximity to the beveled edge of the plate to illuminate its configurations and also the said light chamber.

2. An illuminated device comprising a housing, a measuring member mounted therein and embodying a driving element, a transparent plate closing the forward portion of the housing and having etched configurations, a frame member mounted within the housing provided with a flange for retaining the plate, the flange along the lower edge being cut away in part to expose a portion of the lower edge of said plate, and the said frame being provided with a rearwardly directed box-like extension, the back wall of the same being provided with an opening to admit the driving element of the measuring member, a movable element secured to the outer end of the driving element for movement within the box-like extension, said rear wall of the extension and movable element being of contrasting colors and the bottom of the extension being apertured to admit light into the extension, and an electric lamp located beneath the frame member for directing light to the exposed edge of the plate and for illuminating the interior of the extension.

3. An illuminated device, comprising a configuration bearing element, an element movable in juxtaposition to the configurations and before a field surrounded by the configurations, said field and element being in contrasting colors, and means common to the configurations and to the field and movable element to illuminate said field and element and to edge-illuminate the configurations.

4. An illuminated device, comprising a configuration-bearing element, an element movable in juxtaposition to the configurations and before a field contrasting in color therewith and all forming a visible ensemble, and means located out of said visible ensemble and associated with the configurations and the field and movable element to illuminate only the said configurations on the configuration-bearing element and to cast light upon the movable element and the field.

5. An illuminated device, comprising a configuration-bearing element, a contrasting background member for the said configurations, an element movable in juxtaposition to the configurations and before a field contrasting in color therewith and all forming a visible ensemble, and means located out of said visible ensemble and associated with the configurations and the field and movable element to illuminate only the said configurations on the configuration-bearing element and to cast light upon the movable element and the field.

6. An illuminated device, comprising a fixed, configuration-bearing element, an element movable in juxtaposition to the configurations and before a fixed field displaced axially from the configuration-bearing element, the field and movable element being in contrasting colors and all forming a visible ensemble, means located out of said ensemble to move said movable element, and illuminating means to illuminate the field, the movable element and only the individual configurations on said configuration-bearing element.

7. An illuminated device, comprising a configuration-bearing element and a background element affording a field displaced therefrom and both forming component parts of a visible ensemble, an element contrasting with and movable before the said field and in juxtaposition to the configurations of the configuration-bearing element, means located out of said visible ensemble to move said movable element, and means located out of said visible ensemble and associated with the configuration-bearing element, the background element and the movable element to illuminate said field, the movable element and only the individual configurations on said configuration-bearing element.

8. An illuminated device, comprising a configuration-bearing element and a background element affording a field displaced therefrom and both forming component parts of a visible ensemble, an element contrasting with and movable before the said field and in juxtaposition to the configurations of the configuration-bearing element, and means located out of said visible ensemble and associated with the configuration bearing element, the background element and the movable element to illuminate said field and said movable element and to edge-illuminate the said configurations.

9. An illuminated device, comprising a background element affording a field, a light-transmitting plate in front of said background element and having etched configurations, an element contrasting with and movable before the said field and in juxtaposition to the configurations of the light-transmitting plate, means located behind the background element to move said movable element, and means associated with the light-transmitting plate, the background element and the movable element to illuminate said field and movable element and to edge-illuminate the said etched configurations.

10. An illuminated device, comprising a housing, a background element mounted therein and affording a field, a light-transmitting plate in front of said background element and closing the forward portion of the housing, said plate bearing etched configurations, an element contrasting with the said field and movable between said background element and the light-transmitting plate in juxtaposition to the configurations thereof, and means mounted within the housing to illuminate said field and movable element and to edge-illuminate the said etched configurations.

11. An illuminated device, comprising a housing, a background element mounted therein and affording a field, a light-transmitting plate in front of said background element and closing the forward portion of the housing, said plate bearing etched configurations, an element contrasting with the said field and movable between said background element and the light-transmitting plate in juxtaposition to the configurations thereof, and a lamp located in the lower portion of the housing in proximity to an edge of the plate to illuminate the space between said plate and background element and to edge-illuminate said etched configurations.

FRANCIS H. SCANTLEBURY.